(12) United States Patent
Konkin et al.

(10) Patent No.: US 9,535,304 B2
(45) Date of Patent: Jan. 3, 2017

(54) STABLE ELECTROCHROMIC MODULE

(71) Applicant: Thueringisches Institut Fuer Textil-Und Kunststoff-Forschung E.V., Rudolstadt (DE)

(72) Inventors: Gulnara Konkin, Rudolstadt (DE); Mario Schrödner, Rudolstadt (DE); Hannes Schache, Rudolstadt (DE); Bernd Dawczynski, Jena (DE)

(73) Assignee: THUERINGISCHES INSTITUT FUER TEXTIL- UND KUNSTSTOFF-FORSCHUNG E.V., Rudolstadt (DE)

( * ) Notice: Subject to any disclaimer, the term of this patent is extended or adjusted under 35 U.S.C. 154(b) by 0 days.

(21) Appl. No.: 14/849,476

(22) Filed: Sep. 9, 2015

(65) Prior Publication Data

US 2015/0378234 A1   Dec. 31, 2015

Related U.S. Application Data

(63) Continuation-in-part of application No. 14/002,154, filed as application No. PCT/EP2012/000932 on Mar. 2, 2012, now Pat. No. 9,164,345.

(30) Foreign Application Priority Data

Mar. 4, 2011   (DE) .................. 10 2011 013 132

(51) Int. Cl.
    *G02F 1/15*   (2006.01)
(52) U.S. Cl.
    CPC .............. *G02F 1/1521* (2013.01); *G02F 1/15* (2013.01); *G02F 2001/1515* (2013.01); *G02F 2001/1519* (2013.01)
(58) Field of Classification Search
    CPC .............. G02F 2001/1515; G02F 2001/1519; G02F 2001/1512; G02F 1/15; G02F 1/1525; G02F 1/1523; G02F 1/0018; G02F 2201/44; G02F 26/005; G02F 26/02
    (Continued)

(56) References Cited

U.S. PATENT DOCUMENTS

| 4,752,119 A | 6/1988 | Ueno et al. |
| 4,786,715 A | 11/1988 | Ishikawa et al. |

(Continued)

FOREIGN PATENT DOCUMENTS

| DE | 3615379 A1 | 11/1986 |
| DE | 3717917 A1 | 12/1987 |

(Continued)

OTHER PUBLICATIONS

Holzer, W. et al. "Photo-physical and lashing characterization of an aromatic diamine-xylylene copolymer" Optical Materials 15 (2000) pp. 225-235.

(Continued)

*Primary Examiner* — Mahidere Sahle
(74) *Attorney, Agent, or Firm* — ProPat, L.L.C.

(57) ABSTRACT

Electrochromic module including first and second substrates is provided in which the first and/or second substrate are/is electrically conductive or are/is equipped with an electrically conductive coating. A first electrochromic polymer coating is arranged on the first substrate or the conductive coating, an ion-storage or charge-compensating layer is arranged on the second substrate or the conductive coating, and a polymer gel electrolyte is disposed between the electrochromic coating and the ion-storage or charge-compensating layer. The electrochromic polymer, a polymer of tetraarylbenzidine and (hetero)aromatic diol, is colorless in one redox state and colored in at least two redox states. The ion-storage or charge-compensating layer is formed from (Continued)

material selected from the group comprising cerium oxide, titanium oxide, tungsten oxide, nickel oxide, molybdenum oxide, vanadium oxide and mixtures thereof or redox-active polymer. The inventive modules achieve a large number of switching cycles, a high electrochromic contrast and a high electrochromic efficiency.

19 Claims, 4 Drawing Sheets

(58) Field of Classification Search
USPC .................................................. 359/265–279
See application file for complete search history.

(56) References Cited

U.S. PATENT DOCUMENTS

| | | | |
|---|---|---|---|
| 5,639,914 | A | 6/1997 | Tomiyama et al. |
| 2003/0174377 | A1 | 9/2003 | Reynolds et al. |
| 2007/0268550 | A1 | 11/2007 | Liu et al. |
| 2008/0259433 | A1 | 10/2008 | Weidner |
| 2009/0259042 | A1 | 10/2009 | Corr et al. |
| 2013/0235323 | A1* | 9/2013 | Sotzing .................. C09K 9/02 351/44 |

FOREIGN PATENT DOCUMENTS

| | | |
|---|---|---|
| DE | 19832943 A1 | 2/2000 |
| DE | 102006061987 A1 | 6/2008 |
| DE | 102007037619 A1 | 2/2009 |
| DE | 102008024260 B4 | 4/2010 |
| EP | 1288275 A2 | 3/2003 |

OTHER PUBLICATIONS

Liou, G.-S. et al., "4-Methoxy-Substituted Poly(triphenylamine): A P-Type Polymer with Highly Photoluminescent and Reversible Oxidative Electrochromic Characteristics" Journal of Polymer Science: Part A: Polymer Chemistry, (2007), vol. 45, pp. 3292-3302.

Wu, Han-Yu et al., "Electrochromic Material Containing Unsymmetrical Substituted N,N,N$^1$,N$^1$-Tetraaryl-1,4-phenylenediamine: Synthesis and Their Optical, Electrochemical, and Electrochromic Properties," Wiley InterScience (www.interscience.wiley.com), Dec. 2009, pp. 1469-1470.

Argun, A.A. et al., "Multicolored Electrochromism in Polymers: Structures and Devices," Chemistry of Materials, vol. 16, No. 23, (2004).

Nazmutdinova, G., et al., "Electrochemical Studies on New Electrochromic Polymer," 4$^{th}$ International Symposium Technologies for Polymer Electronics—TPE 10—May 18, 2010, pp. 235-238.

* cited by examiner

STABLE ELECTROCHROMIC MODULE

CROSS-REFERENCE TO RELATED APPLICATIONS

This application is a continuation-in-part of allowed U.S. patent application Ser. No. 14/002,154, filed Aug. 29, 2013, which was a national stage application of International Application No. PCT/EP2012/000932 filed Mar. 2, 2012, which claims priority to German Patent Application No. 10 2011 013 132.9, filed Mar. 4, 2011. Each of U.S. patent application Ser. No. 14/002,154, International Application No. PCT/EP2012/000932 and German Patent Application No. 10 2011 013 132.9 are hereby incorporated by reference herein in their entirety.

FIELD OF THE INVENTION

The invention relates to an electrochromic module comprising a first substrate, a second substrate, the first and/or second substrate being electrically conductive or having been provided with, respectively, a first electrically conductive coating or with a second electrically conductive coating, a coating of an electrochromic polymer disposed on the first substrate or the first conductive coating, an ion-storage or charge-compensating layer disposed on the second substrate or the second conductive coating and an electrically series-connected electrolyte disposed between the electrochromic coating and the ion-storage or charge-compensating layer.

It is a feature of the inventive electrochromic module that it can be switched reversibly under voltage control between more than two color states and has, after a large number of switching cycles without any significant decline in the electrochromic properties, a high electrochromic contrast and a high electrochromic efficiency with rapid switching kinetics, and is additionally leak-proof.

The electrochromic polymer used is an essentially linear condensation polymer formed from a substituted tetraphenylbenzidine and a (hetero)aromatic diol, preferably a (hetero)arylenebis-phenylmethanol. Preferred linear condensation polymers of this type are represented by the general structural formula (I), (II), (III) or (IV)

(I)

(II)

(III)

(IV)

where R1 and R2 are the same or different and are each an alkoxy group, a halogen atom, a cyano group or a hydrocarbyl radical having 1-10 carbon atoms, preferably an alkyl group, an allyl group or a vinyl group, and R3 is a divalent radical of an optionally substituted aromatic or heteroaromatic compound, preferably of benzene, a hydroquinone dialkyl ether, diphenyl ether, biphenyl or naphthalene.

BACKGROUND OF THE INVENTION

Electrochromic modules for use as light filters, displays, dazzle-free rear view mirrors and the like are known. These involve reversible electrochemical oxidation and reduction of redox-active materials such as tungsten oxide, viologen or various polymers such as polythiophene, polyethylenedioxythiophene (PEDOT) derivatives, polyaniline inter alia, which changes the color thereof. Even though the various known electrochromic systems work quite well in individual cases, there are also a number of disadvantages. The electrochromic materials such as bipyridinium compounds (viologens) can be switched between three redox forms, reversibly from the dication to the radical cation and irreversibly to the uncharged form. In this case, the pimerization of the radical cations (formation of a π-complex through the π-electron planes) causes an altered absorption spectrum and has an adverse effect on the color contrast and the lifetime of the EC systems.

Stabilization materials are required, such as metallocenes and metallocene derivatives (DE 102007037619A1, US 2009/0259042A1, DE 102008024260B4) and also other compounds known, for example, from EP 1288275A2 and DE 102006061987, which, by guaranteeing a reversible anodic component reaction, ensure an improved lifetime of the cathode-switching electrochromic formulation (preferably 4,4'-bipyridinium salts) with regard to long-term contrast stability. Here, however, there are likewise problems with regards to color contrast and lifetime. In long-term studies, formation of metallocenium cations becomes perceptible through formation of a yellow-brown layer at the anode. Moreover, the addition of metallocenes to an electrochromically active formulation leads to separation processes which have been uncontrolled to date, for example the deposition of ferrocene aggregates.

Most of the electrochromic materials of significance for applications are switchable only between two colors: viologens (colorless ↔ blue/violet), tungsten oxide ($WO_3$) (light blue ↔ blue), poly-3-hexylthiophene (violet ↔ blue), poly-ethylenedioxythiophene derivatives, such as polyethylenedioxythiophene-polystyrene sulfonate (PEDOT-PSS) (light blue ↔ dark blue). It is thus possible to implement only two-color filters or only monochrome displays.

Moreover, many electrochromic materials, for example $WO_3$ or PEDOT-PSS, are merely pseudo-colorless in thin layers, and so they are only of limited suitability for the applications where the colorless state is required within a broad wavelength range (500-nm).

Numerous studies have been conducted to date with regard to organic materials using the electrochromic effect. The great advantage of the electrochromic polymers and the controllable multichromicity thereof through modification of the chemical structure, and the inexpensive production of arbitrarily thin and large-area layers both on glass or metal substrates and on flexible films and textiles.

Known polymers suitable for electrochromic applications are polythiophenes, polypyrrole, polyphenylenevinylenes and polyaniline. However, these electrochromic conductive polymers have a tendency to alterations under air, especially with regard to the electrical properties and electrochemical stability thereof, and as a result have only a short lifetime. It is therefore important to encapsulate the EC modules and to protect them from outside influences. In this context, the necessary rigid encapsulation impairs the flexibility. Moreover, such polymers have a low glass transition temperature, and polypyrrole and polyaniline, for example, have a poor solubility, and so they are processable with difficulty. These disadvantages constitute serious hindrances to the practical use thereof.

Particular polymers having di- or triarylamine units are known as hole conductors, electroluminescent materials and light-emitting materials, and also multicolored electrochromes (W. Holzer et al., Optical Materials 15, 2000, 225-235).

Examples of the use of diphenylamine and derivatives thereof as electrochromic material or in combination with anthraquinones are described in U.S. Pat. No. 4,752,119. It has been proposed that a solution of a diphenylamine and a conductive salt in a chemically stable organic solvent (preferably propylene carbonate) between two electrodes be used. A $TiO_2$ scattering layer was applied to an electrode, in order to better perceive the color change on the white background. As a result of the application of a voltage of 1.0 V to 1.5 V, the solution takes on a green color. If the voltage is increased to 2.2 V, a blue-green color forms in the solution. If the voltage is switched off, the system returns to the colorless ground state via diffusion. After $10^6$ switching cycles, only relatively small electrochromic deteriorations in the cell were registered. However, such systems comprising liquid media are problematic in terms of the operating temperatures and lifetime; therefore, they have to be hermetically encapsulated.

The invention according to DE 3717917 relates to a novel polymer which consists of repeat units of N,N,N',N'-tetraphenyl-p-phenylenediamine and has electrochromic properties. The polymer is soluble in organic solvents and only becomes insoluble once it has been doped with an electron acceptor and then dedoped. This polymer film shows a yellow color in the potential region of 0.3 V (with respect to Ag/AgCl), a green color in the oxidized state of the first stage at 0.85 V, and a dark blue color in the oxidized state of the second stage at 1.2 V. An electrochromic display was produced through the following steps: a transparent glass plate was subjected to vapor deposition of an insulation film of $MgF_2$ (80 nm) outside the display region, then coated with the abovementioned polymer from a chloroform solution (200 nm), subsequently doped with iodine at 100° C. and then dedoped under high vacuum. On another glass plate coated with a graphite fiber layer, a Prussian blue film (300 nm) was electrolytically deposited. Between the two glass sheets was disposed a porous background panel made from alumina, and the two electrodes were sealed. The electrolyte used was 1 mol/l solution of $LiClO_4$ in propylene carbonate. This electrochromic display was switched repeatedly up to $10^5$ times by applying a coloring voltage of 8 V and a lightening voltage of −8 V. In the course of this, only a small change in the amount of charge was determined in the oxidation reaction compared to the starting value. The production of the electrochromic display is a multistage operation, combined with various different technological operations (doping with iodine at 100° C., dedoping under high vacuum, electrolytic deposition of Prussian blue), which leads to increased technical complexity and investment. Furthermore, the coloring and lightening voltages off ±8 V are very high compared to conventional EC cells and are economically disadvantageous.

DE 3615379 A1 describes a dazzle-free mirror. The first electrochromic layer is formed from a conjugated polymer such as a substituted or unsubstituted triphenylamine, and the other EC layer is a transition metal oxide, such as $WO_3$. In the process described, a film is applied to the electrode from suitable triphenylamine monomer or polymer solutions using a coating process and is subsequently polymerized or crosslinked by means of oxidizing agents, such as iodine, antimony pentafluoride, arsenic pentafluoride or iron oxide. A further means of film formation is an electrolytic polymerization from monomer solution. For example, such a mirror consists of 4,4'-dichlorotriphenylamine polymer and $WO_3$ EC layers with an electrolyte solution of $LiClO_4$ in propylene carbonate with 3% by weight of water. The reflection of the mirror in the ground state is about 70%. In the case of application of a voltage of about 1.45 V, the mirror turns dark blue within about 4 s, and so the reflection is lowered to about 10%. A voltage of about −0.35 V led to decoloring of the mirror. The subsequent coloring (1.1 V, 15 s) and decoloring (−0.4 V, 90 s) were stably reproducible even after 30 000 repetitions. The in situ polymerization or crosslinking of the coating film has the disadvantage that residues of the oxidizing agent in the film can lead to unwanted side reactions in the case of repeated oxidation and reduction, and as a result to an unsatisfactory lifetime of the device. Equally, it gives an additional methodological step for practical use.

Electron-rich triphenylamines have a tendency to be oxidized in the presence of oxygen and light to form an unstable radical cation, which dimerizes further to a tetraphenylbenzidine. This oxidation leads both to yellowing of the polymer layers and to a limitation in the lifetime of the EC elements. By exchange of a group in the para-phenyl position, the dimerization reaction can be significantly reduced. However, it has been published recently that the conjugated homopolymer poly(4-methoxytriphenylamine) has only a moderately stable EC effect up to about 50 cycles (G.-S. Liou et al., Journal of Polymer Science: Part A: Polymer Chemistry, (2007), V. 45, 3292-3302).

Preparation and basic electrochemical properties of polymers having aryl-substituted arylenediamine polymers are present in DE 19832943. It has been found that the electrooxidation of a solution of a 3,3'-substituted triphenyldiamine dimer polymer (TPD polymer) reversibly gives rise to a blue color.

It is desirable to use TPD and tetraarylbenzidine polymers as electrochromic materials in an electrochromic module with suitable electrolyte and a suitable ion-storage or charge-compensating layer, which ensures the performance of redox reactions with favorable cyclic periodicity and hence a stable EC effect.

SUMMARY OF ADVANTAGEOUS EMBODIMENTS OF THE INVENTION

It is an object of the invention to provide an electrochromic module which is perfectly colorless within a broad wavelength range (500-1100 nm) and, in contrast to the prior art, can be produced in few technologically simple, environmentally friendly and inexpensive steps. In addition, it is an object of the invention to display more than two color states with only one electrochromic material and, at the same time, to achieve a large number of switching cycles without any significant decline in the electrochromic properties, a high electrochromic contrast and a high electrochromic efficiency of the modules with effective switching kinetics.

DETAILED DESCRIPTION OF ADVANTAGEOUS EMBODIMENTS OF THE INVENTION

The object is achieved by an electrochromic module comprising a first substrate, a second substrate, the first and/or second substrate being electrically conductive or having been provided with, respectively, a first electrically conductive coating or with a second electrically conductive coating, a coating of an electrochromic polymer disposed on the first substrate or the first conductive coating, an ion-storage or charge-compensating layer disposed on the second substrate or the second conductive coating and an electrically series-connected electrolyte disposed between the electrochromic coating and the ion-storage or charge-compensating layer, characterized in that the electrochromic polymer is an essentially linear condensation polymer which has been formed from a tetraarylbenzidine and a (hetero)aromatic diol and can be switched reversibly under voltage control between more than two redox states, the condensation polymer being colorless in one redox state and colored in at least two redox states, and in that the electrolyte (7) is a polymeric gel electrolyte. As used herein, the term "(hetero)aromatic" refers to aromatic and/or heteroaromatic diols.

In the context of the present invention, the first substrate, which is optionally equipped with a first conductive coating, and the electrochromic coating disposed on the first substrate or on the first conductive coating are also referred to collectively as the working electrode. Analogously to this, the second substrate, which is optionally equipped with a second conductive coating, and the ion-storage or charge-compensating layer disposed on the second substrate or on the second conductive coating are also referred to collectively as the counterelectrode.

The invention proceeds from the known structure of electrochromic modules, and the electrochromic properties of the inventive polymers in combination with a polymeric gel electrolyte and an ion-storage or charge-compensating layer are described.

The polymer, which is redox-stable in accordance with the invention, is a tetraarylbenzidine-diol condensation polymer, preferably a copolymer of the following general structural formula I, II, III or IV:

(I)

(II)

(III)

(IV)

where R1 and R2 are the same or different and are each an alkoxy group, a halogen atom, a cyano group or a hydrocarbyl radical having 1-10 carbon atoms, preferably an alkyl group, an allyl group or vinyl group, and R3 is a divalent radical of an aromatic or heteroaromatic compound, preferably of benzene, a hydroquinone dialkyl ether, diphenyl ether, biphenyl, or of naphthalene.

These polymer films are perfectly colorless and (in the visible light region) transparent in the uncharged state and can be colored and decolored again by a relatively low voltage.

The fact that the polymers used in this application (in one redox state) are colorless is a great advantage over known EC polymers (polythiophenes, polypyrroles, polyphenylenevinylenes, polyaniline and PEDOT-PSS), which are colored both in the oxidized and reduced states. For many applications in which transparency of the device is required/desired outside the colored states (including displays, glazing, spectacles), they are therefore perfectly suited.

The inventive polymers have essentially a linear structure and a high glass transition temperature ($T_g$>200° C.). It is advantageous that the polymers are stable under air in the form of thin films and do not require any inert conditions in the course of processing. Moreover, they have good solubility in solvents such as dioxane, chloroform, dichloromethane, chlorobenzene and toluene, as a result of which it is possible to produce arbitrarily thin layers from solutions on glass or metal substrates, or else on flexible films and textiles, by means of spin-coaters, doctor blade technology, roll-to-roll and printing processes, and spraying methods, the layer thicknesses being between 50 nm and 1 μm, preferably 200 to 500 nm. In contrast to the prior art, the inventive polymer layers do not require any after treatment (crosslinking, polymerizing, doping, dedoping), as a result of which the technological procedure is significantly simplified. At the same time, however, they are insoluble in water, alcohols, aliphatic hydrocarbons, propylene carbonate, ionic liquids, for example ethylmethylimidazolium bis(trifluoromethyl-sulfonyl) imide (EMITf$_2$N) and in 1-ethyl-3-methylimidazolium tetrafluoroborate, which can be used as electrolyte in electrochromic modules.

According to the invention, the EC polymers form homogeneous thin layers (approx. 200-500 nm) from solutions having a polymer content of 0.5 to 30 percent by mass, preferably of 1 to 3 percent by mass, on different glasses and flexible substrates, which attain an electrochromic efficiency in the EC module of up to 950 cm$^2$/C (orange state) and an electrochromic contrast up to 55% transmission for the blue color.

The inventive polymers are oxidized into an electrochromic module in combination with a polymeric gel electrolyte (for example based on EMITf$_2$N) and an ion-storage or charge-compensating layer on application of a voltage of about 0.4 V at the working electrode, as a result of which the module takes on a homogeneous orange color. Moreover, the further oxidation of the EC polymer on application of a voltage of 0.9 V in the EC module gives rise to a homogeneous blue color. In this case, the orange color state is passed through. When the voltage decreases down to −1.0 V, the EC module returns to the colorless state. More particularly, the invention provides EC modules comprising abovementioned polymers, which can be switched as desired between colorless-clear and colored (e.g. colorless/orange and/or colorless/blue) and between two colors (e.g. orange/blue), or else between three states (colorless/orange/blue).

Because of the optimal combination of EC polymer used, polymeric gel electrolyte and the ion-storage or charge-compensating layer, the inventive electrochromic modules exhibit very good switching kinetics from blue to colorless in 2 sec (electrochromic contrast 88%) and from colorless to blue in 7 sec (electrochromic contrast 90%, area 3.5 cm$^2$).

In addition, the EC polymers, on application of a voltage of about 0.4 V, have a broad long-wave absorption maximum (λ=1300 nm) with an electrochromic contrast of about 14%. transmission

Inventive EC modules comprising EC polymers in combination with a polymeric gel electrolyte based on EMITf$_2$N and an ion-storage or charge-compensating layer exhibit a stable EC effect above at least 10 000 and preferably at least 20 000 colorless/blue switching cycles.

In the invention, a gel-type or polymer-based electrolyte comprising a dissolved lithium salt is used. Gel-forming polymers are, for example, poly(vinylidene fluoride-co-hexafluoropropylene) (PVDF-HFP), polyacrylonitrile (PAN) or poly(methyl methacrylate) (PMMA). Preferred solvents are ionic liquids such as 1-ethyl-3-methylimidazolium bis(trifluoromethylsulfonyl)imide (EMITf$_2$N). Other nonexclusive examples of solvents are propylene carbonate, mixtures of propylene carbonate/ethylene carbonate/diethyl carbonate and other carbonates. In addition, the polymer-based electrolyte contains, in a concentration of 0.1 mol/l to 1 mol/l, a lithium salt such as LiTf$_2$N, LiTfO (lithium trifluoromethanesulfonate) or LiClO$_4$ (lithium perchlorate).

The conductive salt and gel-forming polymer are fully dissolved in the electrolyte and thus do not cause any coloring of the electrolyte. As well as a high conductivity (up to 6 mS/cm (EMITf$_2$N, LiTf$_2$N, PVDF-HFP)), the gel electrolyte particularly has good optical transparency in the visual range.

In one embodiment of the invention, the counter-electrode comprises an ion-storage or charge-compensating layer which to an extent of more than 50% by weight, preferably more than 60% by weight, of a material selected from the group consisting of tungsten oxide, nickel oxide, cerium oxide, titanium oxide, molybdenum oxide, vanadium oxide (WO$_3$, NiO, CeO$_2$, TiO$_2$, MoO$_3$, V$_2$O$_5$) and mixtures thereof. Ion-storage or charge-compensating layers based on CeO$_2$—TiO$_2$, mixed oxides, which are based on the principle of Li$^+$ insertion into CeO$_2$, are particularly preferred. Their main task is to rapidly and fully compensate for the charge shifted to the working electrode. A conventional CeO$_2$—TiO$_2$ mixed oxide electrode having a charge storage density up to 26 mC/cm$^2$ using a sol-gel process was used, this already having been described in the literature [C. O. Avellane-da et al., Thin Solid Films 471, (2005) 100-104, A. Verma et al., Thin Solid Films 516, (2008) 4925-4933].

According to a further embodiment of the invention, the counterelctrode comprises a ion-storage or charge-compensating layer which consists essentially of one or more redox-active polymers other than polymer which has been formed from a tetraarylbenzidine and a (hetero)aromatic diol. Such redox-active polymers are generally understood in the art to contain electrostatically and spatially localized redox sites which can be oxidized or reduced, and the electrons are transported by an electron exchange reaction (electron hopping) between neighboring redox sites if the segmental motions enable this. Exemplary redox-active polymers include known electro-chromic polymers, such as polythiophenes, polypyrroles, polyphenylenevinylenes, polyaniline and polyethylenedioxythiophene derivatives, such as PEDOT-PSS. In advantageous embodiments, the redox-active polymers is a polyethylenedioxythiophene derivative, particularly PEDOT-PSS. The structural formula of PEDOT-PSS is provided below:

In embodiments in which the counterelectrode comprises a ion-storage or charge-compensating layer consisting essentially of redox-active polymer, the redox-active polymer is typically present in an amount of more than 50% by weight, preferably more than 80% by weight, and most preferably about 100% by weight.

The redox-active polymers are water based dispersions or can have good solubility in solvents such as dioxane, chloroform, dichloromethane, chlorobenzene and toluene, as a result of which it is possible to produce arbitrarily thin layers from solutions on glass or metal substrates, or else on flexible films, such as polyethylene terephthalate or polyethylene naphthalate films, and textiles, by means of spin-coaters, doctor blade technology, roll-to-roll and printing processes, and spraying methods, the layer thicknesses being between 50 nm and 1 µm, preferably 200 to 800 nm. The redox polymers used to form the ion-storage or charge-compensating layers do not require any after treatment (crosslinking, polymerizing, doping, dedoping).

According to the invention, the redox-active polymers forming the ion-storage or charge compensating layer form homogeneous thin layers (approx. 200 to 800 nm) from solutions having a polymer content of 0.5 to 30 percent by mass, preferably of 1 to 3 percent by mass, on different glasses and flexible substrates.

Figure 5:
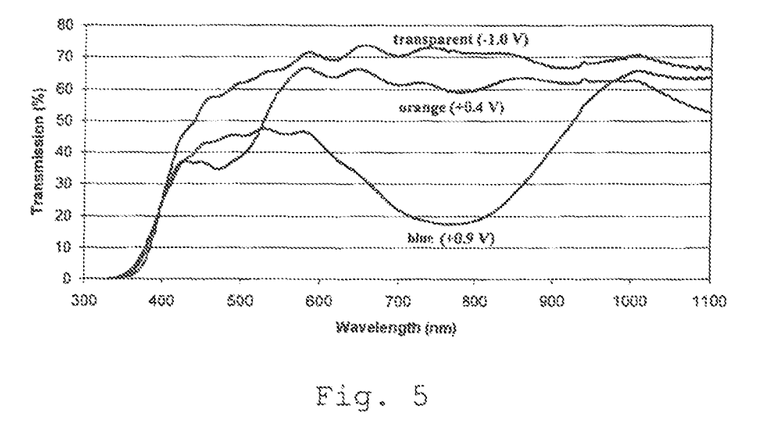
FIG. 5 is a spectral transmission of an exemplary EC module in three different switching states.

Applicants have found that electrochromic modules having an ion-storage or charge-compensating layer comprising redox-active polymer exhibit a broader wavelength range for the color change, extending to wavelengths below 700 nm, as illustrated by a comparison of FIG. 5 with FIG. 9. In addition, when the ion-storage or charge-compensating layer is based on metal oxides, such as cerium oxide, tungsten oxide, nickel oxide, molybdenum oxide or the like, an elevated temperature heating step is typically required, such as sintering the FTO coated glass at 500° C. Electrochromic modules based on glass substrates are not flexible. In addition, polymer films cannot be used as substrates in electrochromic modules requiring sintering. In contrast, an elevated temperature heating or sintering step is not required when the ion-storage or charge-compensating layer is based on redox-active polymer, such as PEDOT-PSS. Consequently, far more flexible electrochromic moldules can be produced by incorporating redox-active polymer as the ion-storage or charge-compensating layer and flexible polymer films as the first and/or second substrates. Such flexible electrochromic modules provide a manufacturing advantage in that the film substrates can be coated "from roll to roll," thereby allowing higher production speeds. In addition, the redox-active polymer can act as a complementary electrochromic layer. In that regard, it was altogether unexpected that the inventive electrochromic modules incorporating redox-active polymer as the ion-storage or charge-compensating layer and an essentially linear condensation polymer formed from a tetraarylbenzidine and a (hetero)aromatic diol as the working electrode electrochromic polymer would be essentially colorless within a broad wavelength range (500-1000 nm).

Figure 1:
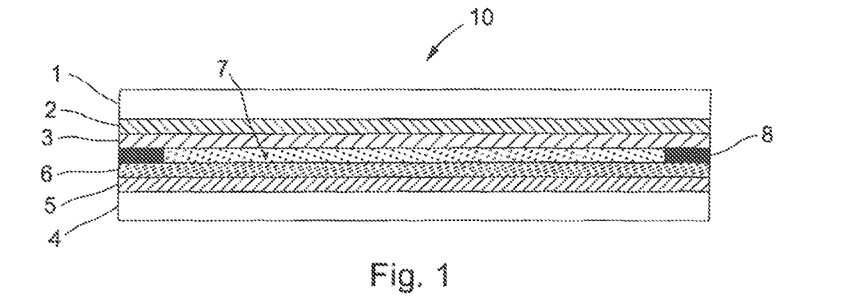
FIG. 1 is a schematic illustration of an exemplary electrochromic ("EC") module with a multilayer structure.

FIG. 1 shows an inventive electrochromic module 10 with a first substrate 1 and a second substrate 4. The first substrate 1 and the second substrate 4 may each consist of a transparent material, such as float glass, quartz glass, a polymer film, a metal foil, or a transparent, semitransparent or nontransparent textile. The second substrate 4 may also consist of a nontransparent polymeric, ceramic, metallic or textile material. Preferably, the first and/or second substrate (1, 4) are each provided with a conductive coating, 2 and 5 respectively, formed from the same or different materials. The conductive coatings 2 and 5 consist, for example, of a transparent conductive oxide (TCO) such as tin oxide or zinc oxide, aluminum-doped tin oxide (ZAO), indium tin oxide (ITO) or fluorine-doped tin oxide (FTO), a metal, for example gold, platinum or stainless steel, or a conductive polymer, for example poly-3,4-ethylenedioxythiophene poly(styrenesulfonate) (PEDOT-PSS). In alternative embodiments of the invention, the first substrate 1 and/or the second substrate 4 consists of an intrinsically conductive textile comprising metallic or metalized filaments. In the case of use of a substrate 1 and/or 4 made from an intrinsically conductive textile, there is no conductive coating 2 or 5.

On the substrate 1 optionally equipped with the conductive coating 2 is disposed a coating 3 consisting of the above-described electrochromic polymer, i.e. of an essentially linear condensation polymer formed from a tetraarylbenzidine and a (hetero)aromatic diol. The coating 3 is produced by applying a solution of the electrochromic polymer by means of known methods, such as spraying, doctor blade coating or spin-coating, to the substrate 1 or to the conductive coating 2.

On the substrate 4 optionally equipped with the conductive coating 5 is disposed an ion-storage or charge-compensating layer 6 consisting to an extent of more than 50% by weight, preferably more than 80% by weight, of a material selected from the group comprising cerium oxide, titanium oxide, tungsten oxide, nickel oxide, molybdenum oxide, vanadium oxide ($CeO_2$, $TiO_2$, $WO_3$, NiO, $MoO_3$, $V_2O_5$) and mixtures thereof, or one or more redox active polymers other than polymer formed from a tetraarylbenzidine and a (hetero)aromatic diol, such as PEDOT-PSS. Preferably, $CeO_2$—$TiO_2$ is the mixed oxide. The ion-storage or charge-compensating layer 6 is preferably produced by applying a dispersion of one of the oxides mentioned or one or more redox active polymers and subsequently drying and optionally sintering. Alternatively, the ion-storage or charge-compensating layer 6 is produced by deposition from the vapor phase, for example by means of CVD or PVD.

The electrochromic module 10 further comprises a polymeric gel electrolyte 7 which is disposed between the electrochromic coating 3 and the ion-storage or charge-compensating layer 6 and comprises at least one crosslinked polymer such as PVDF-HFP, PAN or PMMA, at least one ionic liquid such as 1-ethyl-3-methylimidazolium bis(trifluoromethylsulfonyl)imide, propylene carbonate, mixtures of propylene carbonate/ethylene carbonate/diethyl carbonate and at least one lithium salt such as $LiN(SO_2CF_3)_2$, $Li(CF_3SO_3)$ or $LiClO_4$.

Figure 3:
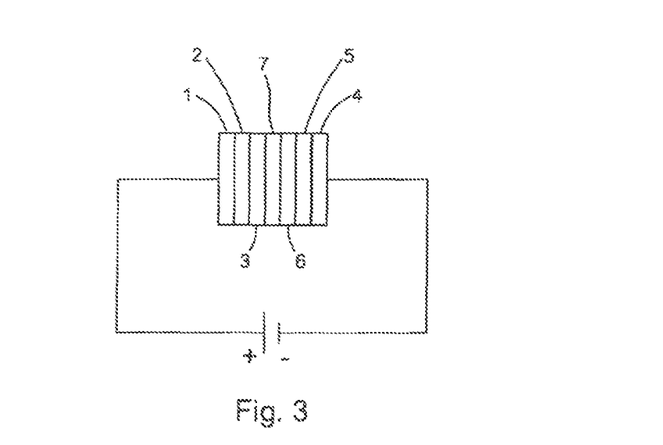
FIG. 3 is an exemplary electrical circuit diagram of an EC module.

According to the invention, the polymeric gel electrolyte 7 is disposed between the electrochromic coating 3 and the ion-storage or charge-compensating layer 6 such that the electrochromic coating 3, the polymeric gel electrolyte 7 and the ion-storage or charge-compensating layer 6 are electrically connected in series (see FIG. 3). Accordingly, also envisaged are electrochromic modules in which the substrate 1 and/or the substrate 4 consists of an intrinsically electrically conductive textile material, or one which has been equipped with a conductive coating 2 and/or 5, the polymeric gel electrolyte 7 penetrating and filling the pores of the substrate 1 and/or 4 and encasing the conductive filaments thereof.

Optionally, the electrochromic module 10 is equipped on the edge side with a seal 8. The seal 8 consists, for example, of a polymeric material and surrounds the edge of the layer of the polymeric gel electrolyte 7. The seal preferably extends partly or fully over the edges of the substrates 1 and 4.

Figure 2:
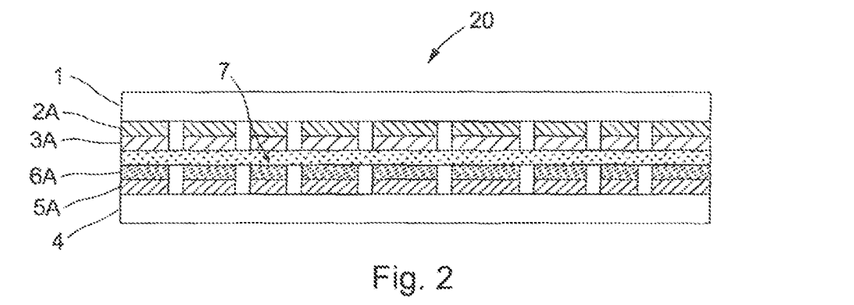
FIG. 2 is a schematic illustration of an alternative exemplary EC module with a multilayer structure.

FIG. 2 shows a further electrochromic module 20 according to the present invention. The module 20 comprises a structured conductive coating 2A and/or a structured conductive coating 5A. In appropriate configurations, in addition, a structured electrochromic coating 3A and/or a structured conductive ion-storage or charge-compensating layer 6A are provided. The term "structured layer" or "structured coating" in the context of the invention refers to a circuitry pattern produced by means of known methods, such as photolithography. More particularly, matrix-like patterns are provided, which enable operation of the electrochromic module 20 in the manner of a display and utilization for the digitally controlled display of images and symbols.

The example which follows illustrates the production of an inventive electrochromic module.

Example 1

A toluene solution containing 1.5 percent by mass of polymer, prepared by polycondensation of 1,4-bis(phenylhydroxymethyl)benzene and N,N'-bis(4-methylphenyl)-N,N'-diphenylbenzidine is applied to an FTO glass (i.e. glass equipped with an electrically conductive coating composed of fluorine-doped tin oxide) by means of a spin-coater, forming a homogeneous film of thickness about 500 nm (after drying). This is envisaged as the working electrode (WE) in the EC module. An ethanolic solution containing 5% by mass of water, 0.2 mol/l of ammonium cerium(IV) nitrate $(NH_4)_2Ce(NO_3)_3$ and 0.2 mol/l of tetraisopropyl orthotitanate (Ti(o-propyl)$_4$) is applied to the other FTO glass by means of a spin-coater in a thin layer, and dried at 150° C. This is repeated three times and the whole assembly is finally heated at 500° C., forming a $CeO_2$—$TiO_2$ mixed oxide. This is then used in the EC modules as the transparent counterelectrode (CE). Two coated FTO glasses (WE and CE) are then combined to give the EC module by means of a heat-sealing film. The EC module is finally filled in a glovebox with polymer electrolyte (PVDF-HFP, LiTf$_2$N 0.1 mol/l in EMITf$_2$N) at 90° C. through two small holes, and the latter are subsequently sealed.

Figure 4:
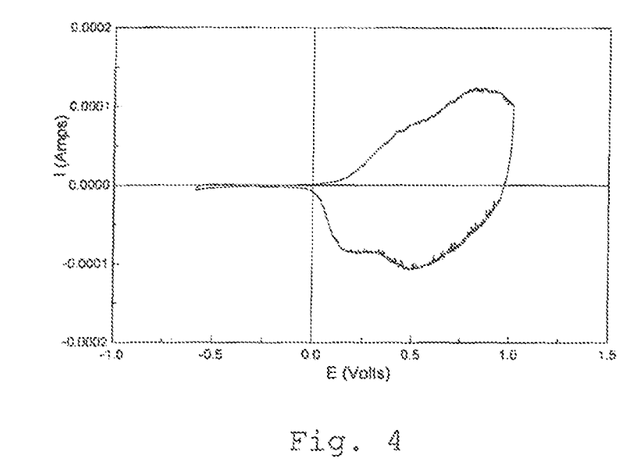
FIG. 4 is a cyclic voltammogram of an exemplary EC module.
Figure 6:
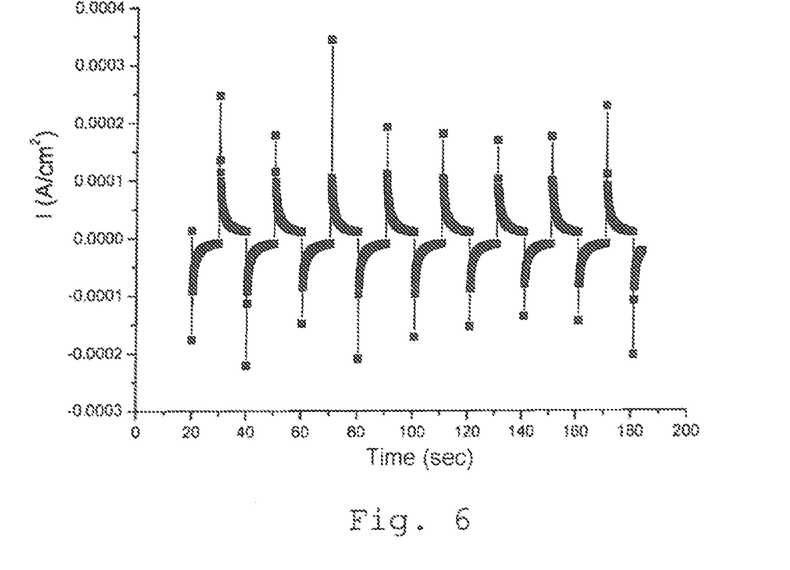
FIG. 6 is a plot of electrical current against time in an exemplary EC module during switching operations.
Figure 7:
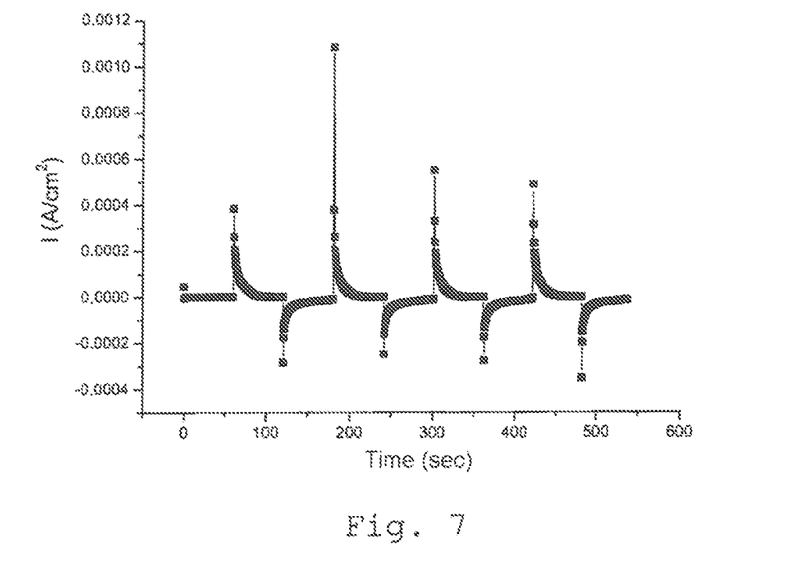
FIG. 7 is a plot of electrical current against time in an exemplary EC module during a switching operation.
Figure 8:
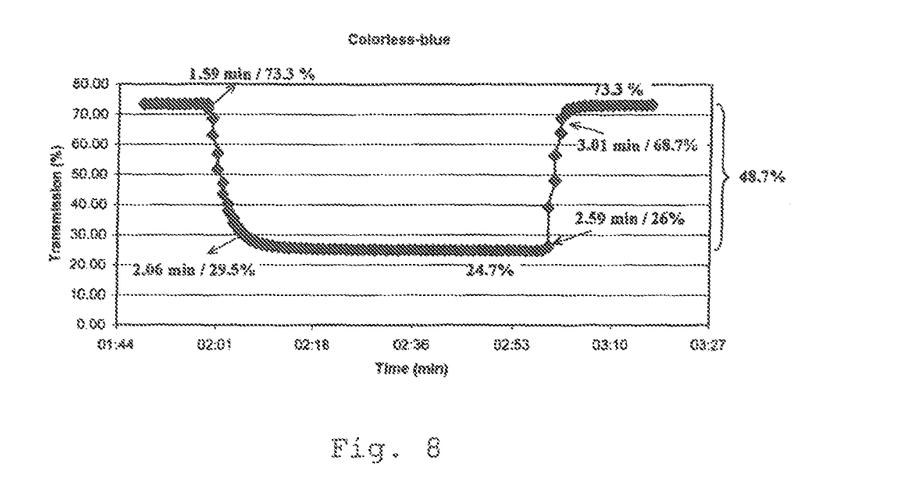
FIG. 8 is a time-dependent transmission during a switching operation.

The cyclic voltammogram of a reversible electrochemical oxidation of the EC polymer in combination with polymer electrolyte (PVDF-HFP, LiTf$_2$N 0.1 mol/l in EMITf$_2$N), demonstrated in an EC module produced according to example 1, is shown in FIG. 4 (measuring instrument: Solartron 1285, 15 mV/S). The UV-VIS transmission spectra of the same EC module in the colorless state and on application of a voltage of +0.4 V (orange) and of +0.9 V (blue) are shown in FIG. 5 (measuring instrument: UNICAM® UV 300, measured against air). Chronoamperometry measurements for the switching operations between the potentials of −1.0 V and +0.4 V (colorless-orange) and −1.0 V and +0.9 V (colorless-blue) are shown in FIG. 6 and FIG. 7. Here, very small current densities of 0.2-0.6 mA/cm$^2$ are observed directly after a potential switch. The switching times are obtained from time-dependent electrooptical measurements on the EC module, produced according to example 1, for colorless/blue switching operations ($\lambda$=750 nm) (see FIG. 8). Tab. 1 summarizes the electrochromic characteristics of the modules according to example 1 for orange and blue coloring.

The electrochromic contrast is defined as the transmission difference between two (color) states at a particular wavelength. In our case, this is the transmission difference between the transparent ground state and the orange or blue states. The transmission of the EC module was measured with a UNICAM® UV 300 UV-VIS spectrometer against air (reference) at room temperature. The transmission is defined as the ratio of the intensity of the light beam transmitted through the electrochromic module to the intensity of the incident light beam in percent. The electrochromic efficiency, $\eta$=log OD/Q, is defined as the result of the optical change in color, expressed by the change of the optical density (ΔOD) in relation to the charge density (Q) applied. The switching time is defined as the time between the colorless state ($T_0$) and the state after coloring (T) (orange or blue coloring) at discharging/charging.

TABLE 1

Electrochromic properties of the module produced according to example 1.

| Characteristic | Orange (λ = 480 nm) | Blue (λ = 750 nm) |
| --- | --- | --- |
| Electrochromic contrast, Δ % T | 29% | 54% |
| Optical density OD = log ($T_{bleaching}/T_{coloring}$) | 0.274 | 0.61 |
| Charge density, Q, (C/cm$^2$) | 2.9E−4 | 2.1E−3 |
| Electrochromic efficiency (cm$^2$/C), η = log OD/Q | 945 | 290 (280*, 300**) |

*after 4200 colorless/blue switching operations
**after 10 000 colorless/blue switching operations Example 2

A toluene solution containing 1.5% by mass of polymer prepared by polycondensation of 1,4-bis(phenylhydroxymethyl)benzene and N,N'-bis(4-methylphenyl)-N,N'-diphenylbenzidine was applied to an ITO-film (i.e. a film coated with an electrically conductive coating composed of indium-doped tin oxide) by means of a spin coater, forming a homogeneous film having a thickness of about 500 nm (after drying). This is referred to as the working electrode (WE) in the EC-module. A dispersion of poly-3,4-ethylenedioxythiophene-poly(styrene sulfonate) (PEDOT-PSS) (CLEVIOS® PH from Heraeus Deutschland GmbH & Co. KG) is applied to a second ITO-film by means of a spin-coater in a thin layer, and dried at 150° C. The coated second ITO-film was then used in EC-modules as the transparent counter electrode (CE). The two coated ITO-films (WE and CE) were then combined to give the EC-module by means of a heat-sealing film. The EC-module was finally filled in a glovebox with polymer electrolyte (PVDF-HFP, LiTf$_2$N 0.1 mol/l in EMITf$_2$N) at 90° C. through two small holes, and the latter were subsequently sealed.

Figure 9:
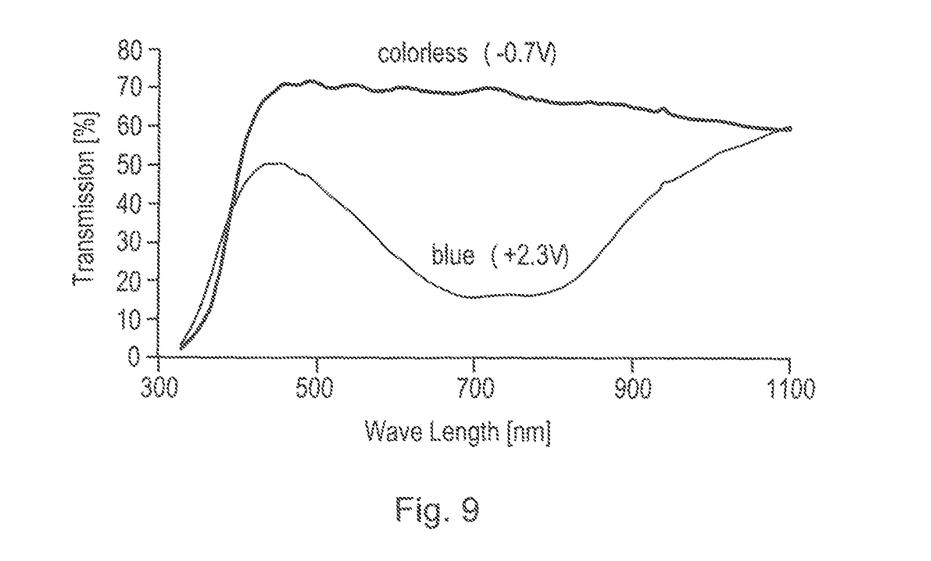
FIG. 9 is a spectral transmission of an alternative exemplary EC module in two different switching states.

The UV-VIS transmission spectra of the foregoing flexible EC-module with PEDOT-PSS as the charge-compensating layer in the colorless state and on application of a voltage of +2.3 V (blue) are shown in FIG. 9 (measuring instrument: UNICAM® UV 300, measured against air). This example shows that in this combination (i.e. with redox-active polymer as the ion-storage or charge-compensating layer) the extraordinary good properties of the electrochromic module are ensured as well. At the same time the wavelength for the change into blue color could be extended into a range of considerably less than 700 nm, as shown in FIG. 9.

That which is claimed:

1. An electrochromic module comprising a first substrate, a second substrate, the first and/or second substrate being either electrically conductive or having been provided with an electrically conductive coating, a coating of a first electrochromic polymer disposed on the first substrate or the conductive coating, an ion-storage or charge-compensating layer disposed on the second substrate or the conductive coating and an electrically series-connected electrolyte disposed between the electrochromic coating and the ion-storage or charge-compensating layer,
wherein the first electrochromic polymer is an essentially linear condensation polymer which has been formed from a tetraarylbenzidine and a (hetero)aromatic diol and can be switched reversibly under voltage control between more than two redox states, the condensation polymer being colorless in one redox state and colored in at least two redox states, the electrolyte is a polymeric gel electrolyte, and the ion-storage or charge-compensating layer is a redox-active polymer other than said first electrochromic polymer.

2. The electrochromic module as claimed in claim 1, wherein the first electrochromic polymer is an essentially linear condensation polymer formed from a substituted tetraphenylbenzidine and a (hetero)aromatic diol of the general structural formula (I), (II), (III) or (IV)

(III)

(IV)

where R1 and R2 are the same or different and are each an alkoxy group, a halogen atom, a cyano group or a hydrocarbyl radical having 1-10 carbon atoms, and R3 is a divalent radical of an optionally substituted aromatic or heteroaromatic compound.

3. The electrochromic module as claimed in claim 2, wherein R1 or R2 or both R1 and R2 are an alkyl group, an allyl group or a vinyl group and R3 is a divalent radical of benzene, of a hydroquinone dialkyl ether, of diphenyl ether, of biphenyl or of naphthalene.

4. The electrochromic module as claimed in claim 1, wherein the first electrochromic polymer has a glass transition temperature Tg of more than 200° C.

5. The electrochromic module as claimed in claim 1, wherein the polymeric gel electrolyte comprises at least one crosslinked polymer, at least one ionic liquid and at least one lithium salt.

6. The electrochromic module as claimed in claim 4, wherein the crosslinked polymer is PVDF-HFP, PAN or PMMA, the ionic liquid is 1-ethyl-3-methylimidazolium bis(trifluoromethylsulfonyl)imide, propylene carbonate, or a propylene carbonate/ethylene carbonate/diethyl carbonate mixture and the lithium salt is $LiN(SO_2CF_3)_2$, $Li(CF_3SO_3)$ or $LiClO_4$.

7. The electrochromic module as claimed in claim 1, wherein the redox-active polymer in the ion-storage or charge-compensating layer is a polyethylenedioxythiophene derivative.

8. The electrochromic module as claimed in claim 1, wherein the polyethylenedioxythiophene derivative is poly-3,4-ethylenedioxy-thiophene poly(styrenesulfonate).

9. The electrochromic module as claimed in claim 1, wherein the ion-storage or charge-compensating layer has a thickness ranging from 5 to 800 nm.

10. The electrochromic module as claimed in claim 1, wherein the ion-storage or charge-compensating layer comprises from 80 to 100 wt % redox-active polymer.

11. The electrochromic module as claimed in claim 1, wherein the electrochromic polymer is switched under voltage control between three redox states.

12. The electrochromic module as claimed in claim 11, wherein the electrochromic polymer, according to the redox state, assumes the color states of colorless, orange or blue.

13. The electrochromic module as claimed in claim 1, wherein on application of a voltage in the range from 0.35 to 0.45 V said electrochromic module has a broad absorption band having an absorption maximum in the wavelength range from 1200 to 1400 nm, and an electrochromic contrast in the absorption maximum of from 13% to 15%.

14. The electrochromic module as claimed in claim 1, wherein said electrochromic module has an electrochromic efficiency of greater than 300 $cm^2/C$.

15. The electrochromic module as claimed in claim 1, wherein said electrochromic module has an electrochromic contrast of greater than 40%.

16. The electrochromic module as claimed in claim 1, wherein the switching time from blue to colorless is less than 2 s and the switching time from colorless to blue is less than 7 s.

17. The electrochromic module as claimed in claim 1, wherein the electrochromic polymer forms a homogeneous layer having a thickness of 5 to 500 nm.

18. The electrochromic module as claimed in claim 1, wherein the first electrochromic polymer coating is not crosslinked, polymerized, doped or dedoped and forms a discrete layer.

19. The electrochromic module as claimed in claim 1, wherein the redox-active polymer other than said first electrochromic polymer is PEDOT-PSS, and the electrochromic module is colorless.

* * * * *